United States Patent [19]
Goldstein

[11] Patent Number: 4,614,576
[45] Date of Patent: Sep. 30, 1986

[54] MICROLITER SCALE ELECTRODIALYSIS APPARATUS

[75] Inventor: Jonathan M. Goldstein, Weston, Mass.

[73] Assignee: Ionics, Incorporated, Watertown, Mass.

[21] Appl. No.: 790,275

[22] Filed: Oct. 22, 1985

[51] Int. Cl.[4] .................... B01D 13/02; B01K 5/00; G01N 27/28
[52] U.S. Cl. ........................... 204/299 R; 204/301
[58] Field of Search ................... 204/299 R, 301

[56] References Cited

U.S. PATENT DOCUMENTS

| | | | |
|---|---|---|---|
| 3,699,033 | 10/1972 | Zeineh | 204/299 |
| 3,755,121 | 8/1973 | Schlutz | 204/299 R |
| 3,989,612 | 11/1976 | Kragt et al. | 204/299 R |
| 4,049,534 | 9/1977 | Posner | 204/299 R |
| 4,061,561 | 12/1977 | Fletcher et al. | 204/299 R |
| 4,161,013 | 7/1979 | Grodzinsky et al. | 204/299 R |
| 4,169,036 | 9/1979 | Anderson | 204/299 R |
| 4,224,134 | 9/1980 | Hoefer | 204/299 R |
| 4,473,452 | 9/1984 | Cantor et al. | 204/299 R |
| 4,518,476 | 5/1985 | Delony et al. | 204/299 R |
| 4,560,459 | 12/1985 | Hoefer | 204/299 R |
| 4,569,749 | 2/1986 | Kadem et al. | 204/301 |

Primary Examiner—Arthur P. Demers
Attorney, Agent, or Firm—Norman E. Saliba

[57] ABSTRACT

A non-flowing batch electrodialysis pocket cell apparatus for rapidly treating milliliter or microliter volume samples of high value biological materials. Said pocket cells being easily removeable from a holding vessel and containing a sample holding cavity which is preferably narrower at the bottom than at the top and with means for adding or removing samples into or out of the top of said cavity as by the use of a pipette or syringe.

11 Claims, 7 Drawing Figures

MICROLITER SCALE ELECTRODIALYSIS APPARATUS

BACKGROUND OF THE INVENTION

1. Field of the Invention

Present methods of altering the electrolyte composition of research or clinical quantities of solutions of biological or medical origin have several disadvantages. Conventional dialysis in bags suffers from being very time consuming (typically 12 to 24 hours), involves complex knot tying and labeling and the risk of total loss of sample. Such conventional dialysis in bags also has a relatively high molecular weight cutoff size (typically 4,000 Daltons) making the dialysis of small macromolecules difficult. During dialysis the osmotic pressure drives water through the dialysis membranes and into the bags, resulting in dilution of the product. Large quantities of rinsing (receiving) solution are required and hence dialysis exchanges wastes from a smaller to a much larger volume.

Diafiltration also generally suffers from a high molecular weight cutoff (typically 10,000 Daltons) and a long processing time (typically up to an hour) and often requires use of a centrifuge.

It is therefore an objective of this invention to provide apparatus which suffers from none of the disadvantages of prior art apparatus and in which processing time can be of the order of minutes rather than hours or days.

Another objective is to provide apparatus in which the handling of milliliter or microliter quantities of sample can be accomplished with laboratory pipettes or syringes.

A further objective is to provide apparatus for altering the electrolyte composition of research or clinical quantities of solutions of biological or medical origin in which the molecular weight cutoff can be 300 Daltons or even less.

Yet a further objective is to provide apparatus for altering the electrolyte composition of milliliter quantities of solutions of low molecular weight compounds such as amino acids, polypeptides and oligonucleotides, all of which would be substantially lost during processing in prior art apparatus.

These and other objectives are accomplished in a non-flowing batch electrodialysis apparatus comprising:

a vessel, tank or box containing anode and cathode means spaced apart horizontally;

at least one demountable, rigid pocket cell having an opening for filling the cell at the top of the cell, said pocket cell positioned between said anode and cathode means and itself comprising at least two parallel spaced apart electrolytically conducting hydraulic barriers or membranes oriented substantially vertically and substantially parallel to said anode and cathode means, at least one of said barriers in each contiguous pair in each pocket cell being ion-selective;

means for preventing leakage of liquids along at least the lateral and lower edges of each said pocket cell to and/or from the interior of said vessel and the interior, liquid holding cavity of said pocket cell, each said cavity being narrower at the bottom than at the top; means for inhibiting the bypass of electric current between said anode and cathode means around the lateral and lower edges of said pocket cell when said vessel is filled with an electrolytically conducting solution to a level below the opening at the top of each said pocket cell and an electric current is applied between said anode means and said cathode means.

2. Description of the Prior Art

Electrodialysis (frequently referred to herein as "ED") has become an accepted apparatus for transferring electrolytes from one solution to another. The state of the art is well described in pages 726 through 738, Volume 8, Kirk-Othmer Encyclopedia of Chemical Technology, 3d Edition, Wiley, N.Y. 1979. Typically 100 or more pairs of spaced electrolytically conducting hydraulic barriers (membranes) are arrayed in parallel between a pair of electrodes. In each pair of contiguous barriers, one barrier has a transport number for ions of one sign substantially greater than that of the above mentioned solutions and of that of the other barrier in said pair. Said substantially selective barriers alternate in the array with barriers which are less selective for the above mentioned ions of one sign. Solutions of electrolyte(s) are introduced into narrow spaces between the barriers and between the electrodes and the barriers adjacent thereto. A direct electric current (which may have some alternating current component) is applied between the electrodes causing electrolyte to be transferred from every other space to the intervening spaces. Electrolyte enriched solution is withdrawn from the latter spaces and electrolyte depleted solution from the former.

None of the above prior art apparatus is satisfactory for the rapid removal of electrolytes from small volumes of solution containing valuable proteins, polypeptides, oligonucleotides and the like.

It is therefore an objective of this invention to provide ED apparatus for rapidly and conveniently demineralizing small volumes of solutions of biological or medical origin which apparatus avoids the loss of valuable or noxious permeates (e.g. carcinogens) into large volumes of receiving (permeate) solution.

This and other objectives will become clear from the following brief description of the drawings and description of preferred embodiments.

BRIEF DESCRIPTION OF THE DRAWINGS

FIG. 1b is a schematic representation in plan view of a cross-section (along the section 1b of FIG. 1a) of the apparatus of FIG. 1a.

DESCRIPTION OF PREFERRED EMBODIMENT

In its broadest aspect, the present invention comprises: a vessel (tank or box) with or without an openable or removable cover containing anode and cathode means spaced apart horizontally, at least one removable, integral, unit pocket cell (having a filling aperture at the top with or without an openable or removable cover) between said anode means and said cathode means, said removable unit cell comprising at least two parallel, spaced apart electrolytically conducting hydraulic barriers (membranes) oriented substantially parallel to said anode and cathode means, at least one of said barriers being ion-selective, support means for holding said removable unit cell in said vessel to orient said barriers substantially vertically and substantially parallel to said anode and cathode means and electrically insulating means for inhibiting bypass of electrolytic current around said removable unit cell when said vessel is filled with electrolyte solution to a level below the top of said unit cell and a direct electric current is applied between said anode means and said cathode means.

Figure 1A:
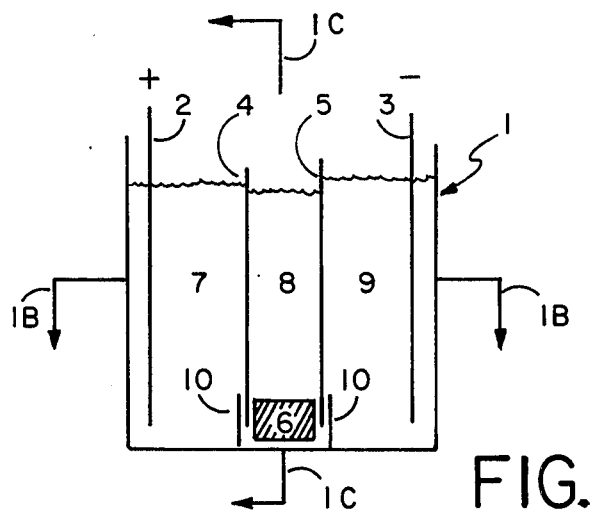
FIG. 1a is a schematic representation in elevation view of a cross-section (along the section 1a of FIG. 1b) of a non-flowing batch ED apparatus according to this invention comprising a vessel containing anode and cathode means spaced apart horizontally, at least one removable, rigid unit pocket cell having a filling aperture at the top, said cell positioned between said anode means and said cathode means, said cell in turn comprising a pair of parallel, spaced apart electrolytically conducting hydraulic barriers oriented substantially vertically and substantially parallel to said anode and cathode means, at least one of said barriers in said pair being ion-selective, sealing means along at least the lateral and lower edges of said unit cell to prevent leakage of liquids between the interior of said vessel and the interior liquid holding cavity of said unit cell, supporting means for holding said unit cell in said vessel to orient said barriers substantially vertically and substantially parallel to said anode and cathode means and electrically insulating means for inhibiting bypass of electrolytic current around said unit cell when said vessel is filled with electrolyte solution to a level below the top of said unit cell and an electric current is passed between said anode means and said cathode means.
Figure 1B:
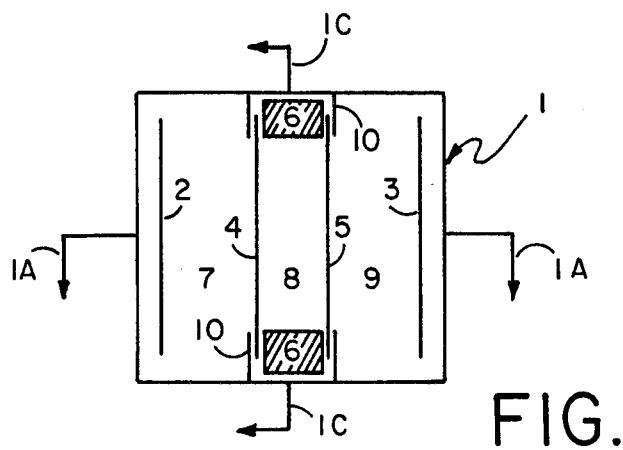

Referring to FIGS. 1a and 1b there is indicated a vessel, box, tank or other container 1 containing anode means 2 and cathode means 3 spaced apart horizontally in said vessel. Between said anode means and cathode means there is indicated a removable, integral unit pocket cell having a filling aperture at the top, with or without an openable or removable cover, said unit cell comprising a pair of parallel, spaced apart electrolytically conducting hydraulic barriers 4 and 5 oriented substantially parallel to said anode and cathode means, at least one of said barriers being ion selective, support means 10 for holding said unit cell in said vessel to orient said barriers substantially vertically and substantially parallel to said anode and cathode means, sealing means 6 along at least the lateral and lower edges of said unit cell to prevent leakage of liquids between the interior (7, 9) of said vessel and the interior liquid holding cavity 8 of said unit cell.

The vessel 1 may for example be integral or demountable and constructed of any electrically insulating material well known in the art, for example, polyethylene, polypropylene, polycarbonate, polymethylacrylate, ABS (acrylonitrile-butadiene-styrene terpolymer) unplasticized polyvinylchloride and the like. The anode and cathode means may take the form, for example, of sheets, expanded sheets, woven mesh, wires, coils, helices (e.g. springs) or, for example, studs, bolts, rivets, or screws passing through the walls of the vessel. The anode and cathode means may be permanently affixed to the vessel or removable and may be unitary or composite, for example, sheets which firmly contact studs passing through the vessel walls or which are held in place by auxiliary electrically conducting springs. The material of construction of the anode and cathode means may be any material well known in the art, for example, graphite, nickel, austenitic stainless steels (e.g. type 316), Incoloy 825, Hastelloy alloy C-276, Inconel 600 or noble metal coated or plated titanium, zirconium, niobium or tantalum or their alloys (e.g. Grade VII titanium).

At least one of the barriers 4 and 5 should be ion-selective. If the apparatus is intended to deionize a solution in the cavity 8 then it is preferred that the barrier 5 be cation-selective in which case the barrier 4 may be non-ion-selective (but electrolytically conducting) or anion-selective.

For some applications of the apparatus of this invention it may be desirable that the barrier 4 be anion-selective and the barrier 5 non-ion-selective, for example when the cations to be removed are multivalent (e.g. $La^{+3}$) or bulky (e.g. cetyl pyridinium cation).

If the apparatus is intended for metathesis of cations, that is, to change a cation of one chemical species for a cation of another species then the barrier 4 should be cation-selective and the barrier 5 should not be anion-selective, that is, it may be non-ion-selective or also cation-selective.

If the apparatus is intended for metathesis of anions, that is, to change an anion of one chemical species for an anion of another species then the barrier 5 should be anion-selective (that is, cation retarding) and the barrier 4 should not be cation-selective, that is, it may be non-ion-selective or also anion-selective.

Suitable cation selective membranes include fabric reinforced homogeneous, isoporous gel membranes comprising sulfonated crosslinked polystyrene (such as types CR61AZL and CZL of Ionics, Inc., Watertown, Mass., U.S.A.); fabric reinforced, macroheterogeneous membranes based on cation exchange resins ground to an impalpable powder, mixed with a hydrophobic thermoplastic and sheeted (such as types MC3142 and 3470 of Ionac Chemical Div., Birmingham, N. J., U.S.A.); fabric reinforced microheterogeneous interpolymer membranes (such as type CMV of Asahi Glass Co., Tokyo, Japan and types CL-25T, CM-1, CM-2 and CLE-E of Tokuyama Soda Co., Tokuyama City, Japan); and unreinforced microheterogeneous interpolymer membranes (such as types C-60 and C-100 of AMF Inc., Springdale, Conn., U.S.A.). Particularly preferred for processing solutions containing biologically active proteins, polypeptides, nucleic acids and the like are fluorinated membranes (such as the fabric reinforced types C/423 and 324 of the DuPont Co., Wilmington, Del., U.S.A. and the unreinforced type 117 of the DuPont Co. and type C-311,313 and 322 of AMF Inc.).

Suitable anion selective membranes include fabric reinforced homogeneous, isoporous gel membranes comprising crosslinked polystryene containing quaternary ammonium groups (such as types AR103PZL and QZL of Ionics, Inc.); fabric reinforced, macroheterogeneous membranes based on anion exchange resins ground to an impalpable powder, mixed with a hydrophobic thermoplastic and sheeted (such as type MA3148 of Ionac Chemical Div.); fabric reinforced microheterogeneous interpolymer membranes (such as type AMV of Asahi Glass Co., and types AM1, AM2 and AM3 of Tokuyama Soda Co.); and unreinforced microheterogeneous membranes (such as Types A-60 and A-100 of AMF Inc.). Particularly preferred for processing solutions containing biologically active proteins, polypeptides, nucleic acids and the like are antifouling anion-selective membranes (such as type AR204SXZL of Ionics, Inc. and types AFN and ACLE-5P of Tokuyama Soda Co.); anion selective membranes having fixed negatively charged groups on the surface (such as type ACS of Tokuyama Soda Co.) and fluorinated anion-selective membranes (such as type TSK of Toyo Soda Manufacturing Co., Yamaguchi, Japan).

Suitable for non-ion-selective membranes include fabric reinforced ultrafiltration membranes having pore sizes in the range of 2 to 20 nanometers and based for example on cellulose acetate, polyamides, polysulfones or vinyl chloride-acrylonitrile copolymers. Particularly suitable for solutions containing biologically active proteins, polypeptides, nucleic acids and the like are ultrafiltration membranes based on polyvinylidene fluoride or based on lightly sulfonated polysulfone.

Other suitable barriers also include ion-selective and non-ion selective affinity membranes containing for example, immobilized enzymes, monoclonal antibodies, or other affinity ligands. Such membranes are fully disclosed in co-pending application Ser. No. 675,057 filed Nov. 26, 1984 now U.S. Pat. No. 4,584,075 and assigned to the same assignee as this present application.

The center spacer/gasket 6 may for example be fabricated from silicone rubber, chlorosulfonated polyethylene (e.g. DuPont Co. Hypalon A), ethylene-propylene rubber, fluorocarbon elastomers such as vinylidene fluoride-hexafluoropropylene copolymer (e.g. 3M Co. Fluorel, DuPont Co. Viton A), vinylidene fluoride-hexafluoropropylene-tetrafluoroethylene terpolymer (e.g. DuPont Viton B or G), vinylidene fluoride-tetrafluoroethylene-perfluoro methyl vinyl ester terpolymer (e.g. DuPont Viton GLT), tetrafluoroethylene-perfluoromethyl vinyl ether copolymer (e.g. DuPont Kalrez) and vinylidene fluoride-chlorotrifluoro ethylene copolymer (e.g. 3M Co. Kel-F 3700); styrene-butadiene or styrene-isoprene thermoplastic block copolymer elastomers (such as Shell International Petroleum Co. Kraton 1101 or 1107) segmented copolyester-ether thermoplastic elastomers (such as DuPont Hytrel); polyethylene, polypropylene, polycarbonate, polymethyl methacrylate, ABS (acrylonitrile-butadiene-styrene terpolymer), polyvinylchloride (plasticized or unplasticized) and the like. Particularly suitable for solutions containing biologically active proteins, polypeptides, nucleic acids and the like are those of the above materials which have low nonspecific absorption of the biologically active material.

Figure 2:
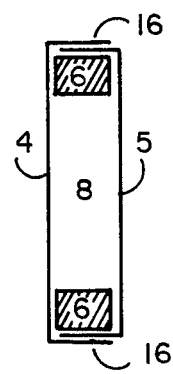
FIG. 2 is a schematic representation in plan view of a cross-section of one preferred construction of a unit cell according to this invention.

Referring to FIG. 2 there is indicated a plan view of the cross-section of one preferred construction of a unit cell for use in the apparatus of this invention. The barriers 4 and 5 are sealed together at their lateral 16 and lower edges for example thermally, with adhesive, with solvent or by sewing (depending upon the composition of the barriers) and the center spacer/gasket 6 inserted into the resulting pocket. Alternatively or in addition the barriers may be sealed to the center spacer/gasket 6.

Figure 3:
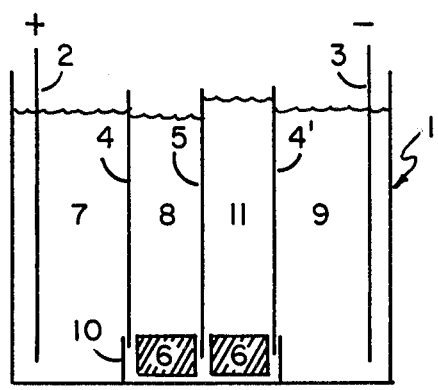
FIG. 3 is a schematic representation in elevation view of a cross-section of one preferred embodiment of this invention comprising at least one removable rigid unit pocket cell comprising in turn three parallel, spaced apart electrolytically conducting hydraulic barriers, at least one of said barriers being ion-selective, thereby forming a depletion (dilution, demineralizing) compartment and an enriching (concentrating) compartment, the latter to receive valuable and/or noxious components removed from the former (diluting) compartment.

Referring to FIG. 3 there is indicated schematically in vertical cross-section another preferred apparatus in accordance with this invention comprising a vessel 1 having spaced apart anode and cathode means 2 and 3 and between said anode and cathode means at least one removable, rigid unit pocket cell comprising at least three parallel spaced apart electrolytically conducting hydraulic barriers 4, 5 and 4' oriented substantially vertically and substantially parallel to said anode and cathode means forming two pocket cavities 8 and 11. Such apparatus is particularly useful when it is desired to remove a valuable and/or noxious ion from solution. For example if it is desired to remove cesium chloride (CsCl) and ethidium bromide (3,8-diamino-5-ethyl-6-phenylphenanthridium bromide, also called homidium bromide) from a solution containing desoxyribonucleic acid (DNA) then the barriers 4 and 4' may be anion selective membranes, for example anion selective membranes having fixed negatively charged groups on the surface facing cavities 8 and 11 respectively. Barrier 5 may be a fabric reinforced ultrafiltration membrane having average pore sizes of about 2 nanometers. The solution of DNA, $CsCl_2$ and ethidium bromide may be inserted into cavity 8 with a pipette or syringe and the cavity 11 filled with an appropriate solution for example a dilute solution of CsCl and ethidium bromide. The anode and cathode compartments 7 and 9 respectively are filled with an appropriate electrolyte solution for example, a buffering mixture of sodium phosphate and sodium acid phosphate dissolved in water or other suitable buffer solution such as citrate-bicarbonate. When a direct current of about 50 milliamperes per sq. centimeter of active area of barrier 4 is applied it is found that after several minutes the contents of cavity 8 have been substantially depleted of cesium and ethidium cations, almost all of which have been accumulated in cavity 11, i.e. have not been lost into cathode compartment 9. It is advantageous if compartment 9 contains an appropriate mixture of sodium chloride and bromide, slightly acidified with hydrochloric acid. In such case, particularly if cavity 11 is smaller than cavity 8 the cesium and ethidium salts can be recovered in useful form.

Figure 4:
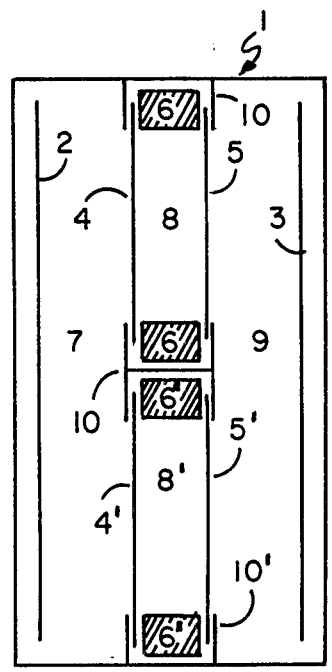
FIG. 4 is a schematic representation in plan view of a cross-section of a preferred embodiment of this invention comprising two or more unit cells electrically in parallel and means for inhibiting the bypass of electrolytic current around said unit cells.

Referring to FIG. 4, there is indicated schematically in a plan view cross-section another preferred apparatus in accordance with this invention comprising a vessel, box, tank or container 1 containing anode and cathode means 2 and 3 (respectively) spaced apart horizontally, at least two removable, liquid unit cells open at the top in parallel electrically between said anode means and said cathode means, said unit cells comprising at least two parallel spaced apart electrolytically conducting hydraulic barriers 4 and 5, respectively 4' and 5' oriented substantially vertically and substantially parallel to said anode and cathode means, at least one of such barriers in each unit cell being ion-selective, support means 10 for holding said unit cells in said vessel to orient said barriers substantially vertically and substantially parallel to said anode and cathode means, seal means 6 and 6' respectively along at least the lateral and lower edges of such unit cells to prevent leakage of liquids between the interior (7, 9) of said vessel and the interior liquid holding cavities 8 and 8' of said unit cells. Anode means 2 and cathode means 3 are indicated as unitary in each case. However they may be segmented, each having a demountable or electrically disconnectable segment corresponding to each of the multiple cavities 8, 8' etc. Each of the barriers 4, 4', 5 and 5' may be the same or different, the distance between the membranes 4 and 5, respectively 4' and 5' may also be different and the volumes of the cavities 8 and 8' may be different (for example by varying the thickness and shape of the center spacers 6 and 6'). It will also be clear that all of the cavities 8, 8' etc. need not be used simultaneously. For example if cavity 8 contains a solution undergoing ED then cavity 8' may also contain a solution undergoing ED, may contain demineralized water or may be empty. Alternatively the unit cell comprising the cavity 8' may be replaced with an electrolytically insulating partition, or one or more of the barriers 4' and 5' in the unit cell comprising the cavity 8' may be replaced with an electrolytically insulating barrier. An apparatus such as that indicated in FIG. 4 having a multiplicity of parallel unit cells is particularly useful for demineralizing a multiplicity of small samples. For example cavity 8 may have a transfer area of about 5 sq. centimeters and a volume of about 1.5 cubic centimeters. It may be filled by means of a pipette or syringe with solution to be deionized and the anode and cathode means thereupon energized. While the sample in cavity 8 is being processed cavity 8' may also be filled with a solution to be deionized. In the preferred configuration, the electrodes are energized through electrical connections which are integral with the cover of the vessel. Thus the current to the cavity 8 would be automatically interrupted while the cavity is being filled with a sample or is being placed in the vessel.

Alternatively cavities 8 and 8' may be filled with appropriate samples to be deionized and the electrodes energized. Additional unit cells (not shown) external to the vessel 1 may be filled with other samples while the contents of cavities 8 and 8' are being deionized. When the latter process is complete the electrodes may be de-energized, unit cells 8 and 8' removed and replaced with the additional unit cells and the electrodes re-energized. It will be clear that the act of removing and replacing the unit cells permits the contents of anode compartment 7 and cathode compartment 9 to mix thus generally restoring the initial conditions in each such compartment. If the apparatus is intended to be frequently or continuously used then the vessel 1 will advantageously contain a water cooled cooling coil of electrically insulating material.

Figure 5:
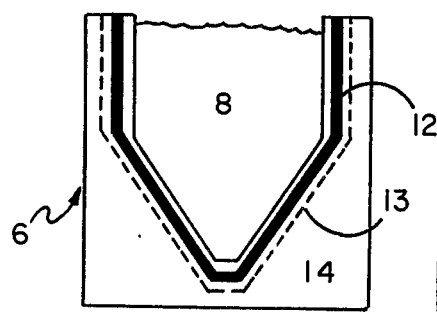
FIG. 5 is a schematic representation in elevation view of a cross-section (along a section 1c of FIGS. 1a and 1b) of one preferred unit cell according to this invention.

Referring to FIG. 5, there is indicated schematically in elevation view a preferred configuration for the center spacer 6. 12 indicates a preferred sealing means in the form of a bead integral with the center spacer 6 or an O-ring tightly fitting in a groove in center spacer 6 and/or glued therein. A barrier (not shown) is placed over the cavity 8 and the sealing means 12 to the barrier generally extending to the dotted line 13. The area 14 beyond the dotted line 13 to the outer edges of the center spacer 6 may be raised, having approximately the same thickness as the barrier. The optional area 14 may be integral with center spacer 6 (being formed for example by molding in place) or may be a separate piece, preferably glued or otherwise fastened to center spacer 6. The cavity 8 is concave downward and preferably narrower at the bottom than at the top, for example having the general shape of a "V" to facilitate efficient removal of the contents with a pipette or syringe. The bottom of the cavity is shown as flat but it may also have other convenient shapes.

Figure 6:
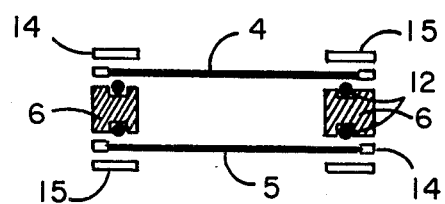
FIG. 6 is a schematic representation in plan view of a cross-section of another preferred embodiment of a unit cell according to this invention.

Referring to FIG. 6, there is indicated schematically in plan view a preferred construction for unit cells suitable for this invention. 15 represents external frames generally having the same shape in elevation as center spacer 6 though one or both may conveniently have larger outside dimensions to facilitate mounting the unit cell in holding means 10 (for example as indicated in FIG. 1a, 1b, 3 and 4). The components indicated may be held together with clamps, rubber bands, plastic rivets, glue, stainless steel staples, integral plastic snaps or by other means obvious to those skilled in the art. The outer frames 15 are preferably rigid and as convenienty made from polycarbonate, polymethylmethacrylate, ABS (acrylonitrile-butadiene-styrene terpolymer), nylon or acetal.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent assemblies.

What is claimed is:

1. An electrodialysis apparatus comprising:
    a vessel fabricated from electrically insulating material and containing anode and cathode means spaced apart horizontally;
    at least two removable unit cells electrically in parallel between said anode means and said cathode means, each of said unit cells comprising at least two parallel spaced apart electrolytically conducting hydraulic barriers oriented substantially vertically and substantially parallel to said anode and cathode means, said barriers thereby forming at least one interior liquid holding cavity in each unit cell, at least one of said barriers in any adjacent pair in each unit cell being ion-selective; and means for inhibiting the bypass of electrolytic current around said unit cells when said vessel is filled with electrolyte solution to a level below the top of each said unit cell and a direct electric current is applied between said anode means and said cathode means.

2. Apparatus according to claim 1 in which the barrier having the lower transport number for cations is substantially non-ion-selective.

3. Apparatus according to claim 1 in which the barrier having the lower transport number for cations is substantially an aliphatic polymeric anion selective membrane.

4. Apparatus according to claim 1 in which the barrier having the lower transport number for cations is an anion selective membrane having bound negatively charged groups on at least the surface facing the interior liquid holding cavity of said unit cell.

5. Apparatus according to claim 1 in which the two spaced hydraulic barriers comprise a perfluoro cation exchange membrane and a perfluoro anion exchange membrane.

6. Apparatus according to claim 1 in which at least one of said barriers in any adjacent pair in each unit cell comprise an affinity membrane having biospecific sorbing properties for biospecifically, sorbable components.

7. Apparatus according to claim 1 in which each of said unit cells has an aperture at the top for filling or removing liquids.

8. Apparatus according to claim 1 in which said liquid holding cavity is substantially narrower at the bottom than at the top.

9. Apparatus according to claim 1 in which there is located sealing means along at least the lateral and lower edges of each of said unit cell to prevent leakage of liquids between the interior of said vessel and the interior liquid holding cavities of said unit cells.

10. Apparatus according to claim 1 in which there is located supported means for holding said unit cells in said vessel to orient said barriers substantially vertically and substantially parallel to said anode and cathode means.

11. A non-flowing batch eletrodialysis apparatus comprising:
- a vessel fabricated from electrically insulating material and containing anode and cathode means spaced apart horizontally;
- at least one removable, rigid unit pocket cell between said anode means and said cathode means, said unit cell open at the top and comprising at least two parallel, spaced apart electrolytically conducting barriers oriented substantially parallel to said anode and cathode means, said barriers thereby forming at least one interior liquid holding cavity in said unit cell, said liquid holding cavity being substantially narrower at the bottom than at the top, at least one of said barriers in any adjacent two barriers in said unit being ion-selective, that barrier of said adjacent two barriers having the higher transport number for cations being nearer said cathode means;
- sealing means along at least the lateral and lower edges of said unit cell to inhibit leakage of liquids between the interior of said vessel and said interior fluid holding cavity;
- support means for holding said unit cell in said vessel to orient said barriers substantially vertically and substantially parallel to said anode and cathode means;
- electrically insulating means for inhibiting bypass of electrolytic current around said unit cell when said vessel is filled with electrolyte solution to a level below the top of said unit cell and a direct electric current is applied between said anode means and said cathode means.

* * * * *